(No Model.)
D. STARK.
FEED WATER HEATER.
No. 442,244. Patented Dec. 9, 1890.
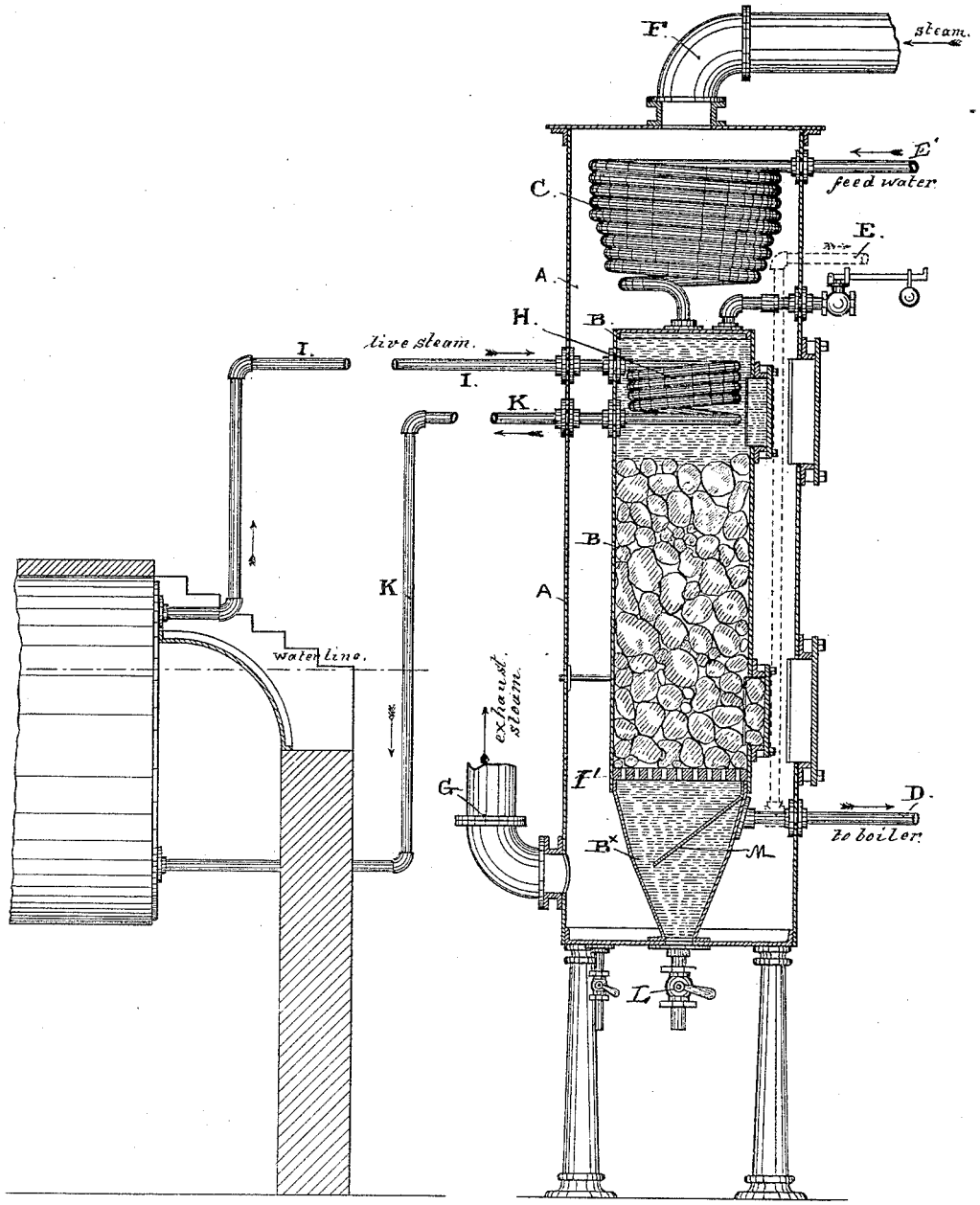
Witnesses:
Inventor:

UNITED STATES PATENT OFFICE.

DAVID STARK, OF SAN FRANCISCO, CALIFORNIA.

FEED-WATER HEATER.

SPECIFICATION forming part of Letters Patent No. 442,244, dated December 9, 1890.

Application filed June 1, 1889. Serial No. 312,935. (No model.)

*To all whom it may concern:*

Be it known that I, DAVID STARK, a citizen of the United States, residing in the city and county of San Francisco, State of California, have invented certain new and useful Improvements in Feed-Water Heaters, of which the following is a specification.

My invention relates to improvements in feed-water heating and purifying apparatus, which utilizes the exhaust-steam from an engine as the heating medium to raise the temperature of the water, and it has for its object to provide an apparatus for special use, or particularly adapted to operate in those situations where the supply of exhaust-steam for the heater is irregular, or is subject to interruptions, such as would be occasioned by the engine being shut down at times during work, while at the same time a constant supply of heated and purified water at even temperature is required. Such a heating apparatus is employed to advantage in various works and manufacturing establishments, where a constant supply of heated and purified water is required for use; but it is found in many cases that an even temperature of the water cannot be maintained in this class of heaters and purifiers where the engine $f$, from which is obtained the exhaust-steam, is not running continually.

My improved apparatus is intended for use in situations of the kind before mentioned, where the purified water is taken from the apparatus for various purposes in manufactures, such as for washing, cleansing, and other operations; and to such end and purpose it consists in the specific construction and combination of parts, as hereinafter described, and pointed out in the claim, producing a water heating and purifying apparatus of improved character.

The accompanying drawing, that forms a part of this specification, represents my improved apparatus in elevation and generally in section.

A and B indicate two cylindrical shells of different diameters, set concentrically to form an inner chamber and an annular space surrounding it. The space or compartment at the top, from which the annular space is a continuation downward around the shell of the inner chamber, contains a heating-coil C, having connection, through one side of the compartment, with a water-supply pipe E' outside, and at the other end extending into the chamber B through its closed head or top.

The upper compartment and the annular continuation of such exhaust-steam space have an inlet F at the top and an outlet G at the bottom of the space, with conducting-pipes leading from them. The pipe of the outlet G is connected with the engine-exhaust, and the other pipe below carries away the discharged steam from the apparatus.

The chamber B is partially filled with a body of purifying material supported by a perforated partition I' at the bottom of the chamber and extending about two-thirds, or thereabout, of the height, so as to leave a water-space K at the top. A hot-water well or chamber $B^x$ below the perforated bottom is formed to collect the purified water and is provided with an outlet D or E for the water, through either one of which the purified water in a heated condition is drawn off for use.

A blow-off outlet L is provided in the bottom for removing from time to time any sediment collecting in the well. This sediment, which may find its way through the perforated bottom, is thrown to the bottom and kept away from the water-outlet by the inclined apron or plate M, under which is located the outlet for the filtered water.

H is a live-steam coil, with inlet I and outlet K set in the water-space above the purifying material of the central chamber and having connections at both ends with the steam-generating space of the boiler, circulation of live steam being obtained by this means through the coil in the water-space over the purifying material in addition to the circulation of exhaust-steam from the engine around the water-coil above and through the annular space around the purifying-chamber. The upper end of this coil is carried into the steam-space of the boiler; but the lower end is connected either directly with the water-space of the boiler or indirectly with it by coupling it to the feed-water pipe of the boiler behind the check-valve in the water-space below, and the temperature of the water will be brought up to the heating capacity of the live-steam coil before filtration, any loss in heat arising from interruptions in the circulation of the exhaust-steam being supplied by that coil. No appreciable consumption of live steam is found to take place by thus diverting such a small portion from the boiler through the filtering-chamber, and therefore the valuable effect and results sought to be accomplished are not obtained at the expense of the economical operation of the apparatus.

In addition to its other advantages, this improved apparatus will be found to have special purifying properties or qualities for operating on water containing considerable quantity of mineral matter in solution and salts that demand higher degrees of heat to effect separation than can ordinarily be obtained from the action of exhaust-steam alone. The body of water in the top part of the filtering-chamber is thus brought in contact with this live-steam coil after having passed through the upper water-coil in the exhaust-steam chamber and before descending through the filtering medium, by virtue of which any fall in temperature due to fluctuations or interruptions in the circulation of exhaust-steam in the upper chamber will be corrected by the live-steam coil.

The present invention is intended as an improvement or addition to my patent of June 19, 1888, No. 384,937; but it may be used with other forms of heating devices also.

Having thus described my invention, what I claim, and desire to secure by Letters Patent, is—

In a feed-water heater, the combination of a heating-cylinder having connection to the exhaust of the engine, a feed-water coil arranged in the top of said cylinder, with a smaller heating and purifying cylinder inclosed in the main cylinder, a live-steam coil arranged in the top of smaller cylinder, and a water well or compartment at the bottom of the inner cylinder, having a discharge to boiler, as set forth.

In testimony that I claim the foregoing I have hereunto set my hand and seal.

DAVID STARK. [L. S.]

Witnesses:
GEO. T. KNOX,
J. E. FORD.